(12) United States Patent
Acone et al.

(10) Patent No.: US 8,071,199 B2
(45) Date of Patent: Dec. 6, 2011

(54) BOTTLE LABELS

(76) Inventors: Onofrio Acone, Baronissi (IT); Davide Acone, Baronissi (IT)

( * ) Notice: Subject to any disclaimer, the term of this patent is extended or adjusted under 35 U.S.C. 154(b) by 0 days.

(21) Appl. No.: 12/936,024

(22) PCT Filed: Sep. 7, 2009

(86) PCT No.: PCT/IB2009/006774
§ 371 (c)(1),
(2), (4) Date: Oct. 1, 2010

(87) PCT Pub. No.: WO2010/029402
PCT Pub. Date: Mar. 18, 2010

(65) Prior Publication Data
US 2011/0033669 A1    Feb. 10, 2011

(30) Foreign Application Priority Data

Sep. 10, 2008  (IT) ................ PI2008A0092

(51) Int. Cl.
*B32B 3/00* (2006.01)
*C03B 29/00* (2006.01)
*B05D 3/02* (2006.01)

(52) U.S. Cl. ...... 428/161; 428/41.7; 428/42.1; 428/172; 428/210; 427/255.13; 427/279; 427/376.2; 156/89.11

(58) Field of Classification Search ............ 428/40.8, 428/41.7, 42.1, 161, 172, 210; 156/89.11, 156/89.24, 242, 244.19; 427/255.11, 255.13, 427/279, 376.1, 379, 376.2
See application file for complete search history.

(56) References Cited

U.S. PATENT DOCUMENTS

| 4,775,786 | A | 10/1988 | Yamano |
| 6,498,032 | B1 | 12/2002 | Clements |
| 6,582,805 | B1 | 6/2003 | Moh |
| 7,142,942 | B2 * | 11/2006 | Poeting ............... 700/157 |
| 2006/0062971 | A1 * | 3/2006 | Bourban et al. ........ 428/172 |
| 2006/0228525 | A1 * | 10/2006 | Dakowski ............... 428/172 |

FOREIGN PATENT DOCUMENTS

| EP | 0905664 A1 | 3/1999 |
| GB | 2286380 A | 8/1995 |
| GB | 2401581 A | 11/2004 |

OTHER PUBLICATIONS

WO 86/02346, Apr. 1986, plus machine translation of description and claims.*
PCT, International Search Report, Jan. 4, 2010.

* cited by examiner

*Primary Examiner* — Donald J Loney
(74) *Attorney, Agent, or Firm* — Themis Law

(57) ABSTRACT

The present invention refers to labels for bottles of a rigid material. In particular, a rigid body of a ceramic material reproduces writing characters in high and/or low relief and is realized by overlapping at least a first layer of terracotta with a second layer. According to the present invention, the first layer reproduces the writing characters in high and/or low relief and the second layer is a layer of enamel disposed over the first layer such to cover at least the writing characters uniformly.

8 Claims, 8 Drawing Sheets

Sez A-A

Bottle Axis

Sez A-A

Bottle Axis

Lateral view of the mould

Top view of the mould

BOTTLE LABELS

FIELD OF THE INVENTION

The present invention relates to the technical field of labelling bottles for beverages in general. In particular, the present invention relates to a new type of label.

Described below is also the related method for realizing said label.

BACKGROUND ART

Ordinary bottle labels, on which names and/or features of the product are indicated, have long been known.

Bottle labelling has become an important means of identification which allows not only presenting the bottled product to the public in a distinctive manner, but also making the final consumer know important features of the content. This is the case not only of the labelling of prestigious bottles (for example, bottles of wine or sparkling wine of big brands) but also of bottles of more ordinary products.

It is also known how the usually used labels of paper, cardboard and similar materials are not free from problems of different nature. For example, wine bottles are many times stored for long periods of time in cellars in order to keep them at the right temperature. However, an ordinary glued paper label rarely retains its entirety with the passing of time due to the effects of humidity and condensation that appear on the surface of the bottle itself. The consequence is the progressive deterioration of the label by wear and tear and the impossibility of reading it.

Although the impossibility of reading the label can apparently seem a minor technical problem, its importance is quite relevant for those who market the bottles and work in this field. Suffice it to think of the prestigious restaurants richly furnished with excellent wine bottles in their cellars or, similarly, to the producers and suppliers of bottles of wine or other prestigious beverages in general who usually supply said restaurants. In case a client of a restaurant, for example, ordered a valuable bottle and this were "not presentable" from the point of view of the label, the restaurant would most probably be forced to take another one and put that bottle aside, not being able to sell it and suffering some kind of economic loss. In other cases, the client herself could reject the bottle when it is presented to her precisely because the label is illegible, and this could cause a loss of image of the restaurant in question and/or of the producer or supplier.

A problem also exists for the conservation of the bottle in a fridge. Also in this case, humidity drops and, above all, condensation drops can significantly damage the label, as already described.

It should also be highlighted that the ordinary and customarily used labels have a high degree of absorbency. This implies that, in case of accidental spilling of liquids on the label or of a need to wash the bottle, the label could be inevitably compromised, rendering the bottle not presentable and therefore not suitable for use.

Moreover, all the customarily used paper or cardboard labels allow simple writings in ink, which can be erased, deteriorate or disappear precisely due to the action of humidity and the passing of time.

Last but not least, it should be highlighted that all the usually used labels are of the single-use type, not allowing their removal and successive new application. The removal of a standard paper or cardboard label would cause its excessive deterioration and consequently, it would be impossible to use it again.

In U.S. Pat. No. 6,582,805 there is described a particular label composed of two ceramic layers overlapped one over the other and reproducing bar codes that are legible either to optical readers or to the naked eye. Although such label structure could apparently result suitable for the overcoming of some of the technical inconveniences indicated above, it still presents additional different disadvantages. The characters obtained thereon are indeed realized through an incision, and therefore removal of material, directly off the superior covering layer with the aim of realizing a contrast between the covering layer and the one below at sight. Still, it is evident how such a technique of incision causes a loss of homogeneity of the covering of the writing, rendering the same not very appealing. Moreover, such an incisive or abrasive technique can be the cause of possible breakages of the covering layer itself, rendering the incision of complex and very deep characters impossible. In that sense, with such a technique only very simple and not very deep linear traits can be reproduced and, as a consequence, not conspicuous to the naked eye.

DISCLOSURE OF INVENTION

It is therefore the aim of the present invention to provide a new type of bottle label that overcomes all the above mentioned inconveniences.

In particular, it is the aim of the present invention to provide a new type of label that is practically non-absorbent, thus resisting to the effects of humidity with the passing of time and of liquids in general, and avoiding the absorption of them and the consequent deterioration.

It is also the aim of the present invention to provide a label that is washable when needed.

It is also the aim of the present invention to provide a label that allows reproducing writings of the three-dimensional type and anyway not only obtained exclusively with the simple use of ink.

It is also the aim of the present invention to provide a label that can be eventually re-used after its removal from the bottle.

Lastly, it is the aim of the present invention to provide a label in which the characters in high and/or low relief can be conspicuous to the naked eye, even without the need of color contrasts, and can also have uniformity and continuity.

These and other aims are therefore reached with a label for bottles, particularly for bottles of wine or sparkling wine, comprising at least a rigid body of a ceramic material reproducing writing characters in low and/or high relief, the said rigid body comprising at least a first layer of terracotta and at least a second layer. In accordance with the present invention, the first layer reproduces the writing characters in high and/or low relief and the second layer is a layer of enamel overlapped on the first layer in such a way to cover at least said writing characters uniformly.

In accordance with the present invention, therefore, the enamel uniformly covers the writing in high and/or low relief, rendering the same shiny, homogeneous, continuous, and therefore conspicuous.

Preferably, the rigid body is realized with a thickness dx comprised within a range of 2 mm to 6 mm, although different thickness can anyway be employed.

Advantageously, the rigid body is configured according to a predetermined radius of curvature $R1$ in such a way as to trace at least approximately the curved shape of the bottle.

Moreover, the label comprises an internal face to be placed in adherence to the bottle, said internal face comprising gluing means.

Advantageously, among the different possible solutions, the gluing means can comprise glue drops placed in predetermined spots on the internal face.

Alternatively, the gluing means can comprise a layer of an adhesive material, such as a liquid bi-component of strong seal.

There is also described herein a method for producing a bottle label comprising at least the steps of:

Casting liquid clay in an appropriate mold of plaster reproducing characters in high and/or low relief in such a way as to obtain a layer that reproduces the characters in high and/or low relief from the mold;

Successive partially and naturally drying said layer of clay;

Curving said layer of clay and simultaneous completion of the drying;

Successive firing in a kiln at a temperature of about 980° C. (Celsius degrees) so to obtain the terracotta;

Successive covering of said terracotta with a layer of enamel at high fusibility and successive new firing in a kiln at a temperature of about 980° C. so as to cover said characters uniformly.

With such a technique, it is therefore possible to realize, directly on the layer of terracotta layer underneath, the characters in high and/or low relief. The successive uniform covering with enamel of at least the characters guarantees a homogeneity not obtainable otherwise with incision.

Advantageously, the operation of curvature comprises the application of the partially dried layer of clay to a mold at a predetermined radius of curvature. In such a way, a deformation is applied to the label, curving it as much as one likes.

BRIEF DESCRIPTION OF THE DRAWINGS

Additional features and advantages of the label according to the invention will be clearer with the description of some embodiments that follows, made to illustrate but not limit, with reference to the annexed drawings, where.

DESCRIPTION OF A PREFERRED EMBODIMENT

Figure 1:
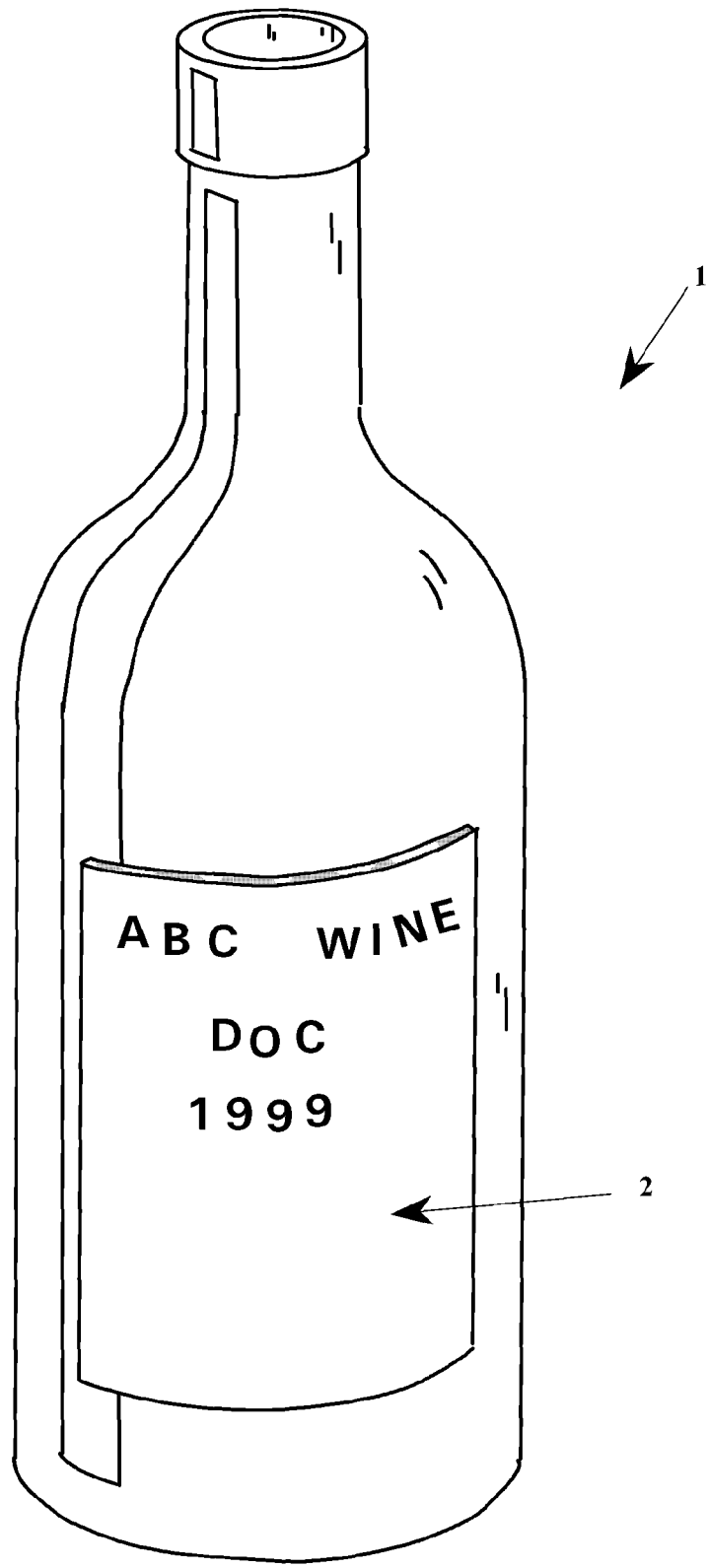
FIG. 1 represents an axonometric view of a traditional bottle 1 on which a label is applied according to the invention.

With reference to FIG. 1, the application to a bottle 1 of a type of label 2 according to the invention is described.

Figure 2:
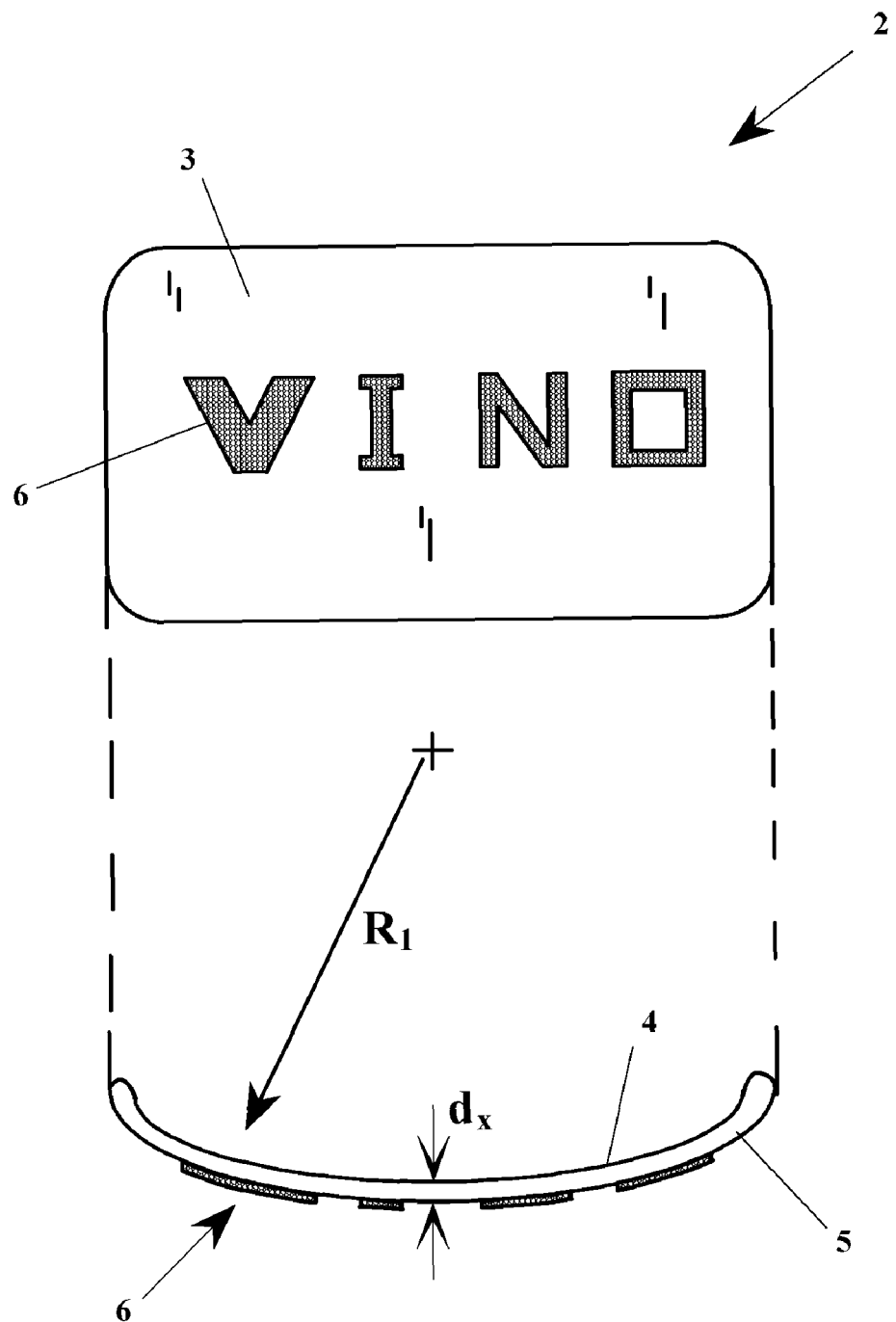
FIG. 2 represents a frontal and top view relative to the label alone.

In particular (see FIG. 2), the label in question comprises a rigid body 3 of a ceramic material and further comprises writing characters 6 realized in high and/or low relief. In particular, always as indicated in FIG. 2, the body 3 has a predetermined thickness dx with values comprised within a range from 2 mm to 6 mm, while the length and width of the label are compatible with the standard dimensions of labels that are applied to bottles. Different dimensions can certainly be obtained without departing from the present inventive concept. Always as represented in FIG. 2, the rigid body 3 comprises an external face 5, generally destined to reproduce the writing 6 on the label, and an internal face 4, generally destined in use to be placed in adherence to the surface of the bottle. Moreover, also as shown in FIG. 2, for illustration purposes, a radius of curvature of the label indicated with R1 for illustration purposes only. The radius of curvature is suitable for tracing the curvature of the bottle (at least approximately), thus allowing the correct application and adherence of the label to the external surface of the bottle.

FIG. 2 further shows, for illustration purposes only, the label reproducing, in correspondence of its external face 5, an identifying writing 6 (the particular writing depicted in the figure is meant just to illustrate and therefore not limit). One of the essential distinctive features of these new types of labels are related to the realization of the same, which allows to obtain a writing 6 in high and/or low relief.

Figure 3:
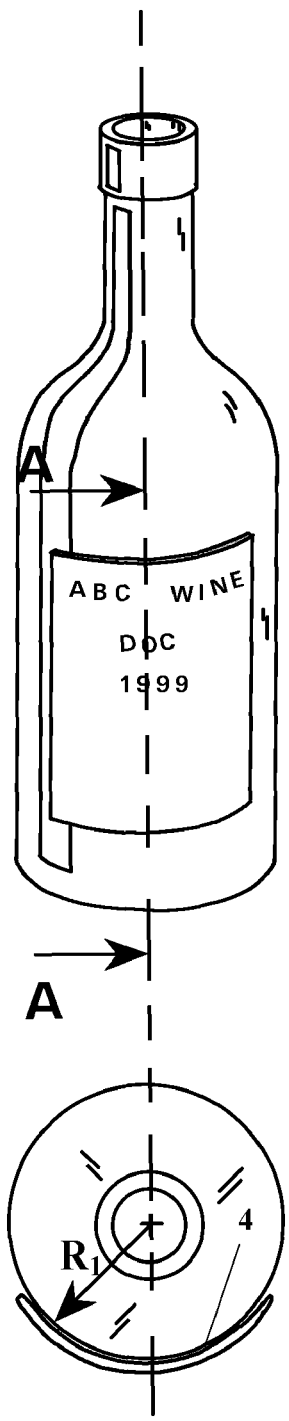
FIG. 3 represents a frontal and top view relative to the bottle on which the label is applied in accordance with the present invention.

FIG. 3 represents a simple application of the new type of label to a bottle. There is shown here the generic radius of curvature R1, which causes the internal face 4 of the label to match the surface of the bottle, in a predetermined position. FIG. 3 further shows the indication of a section A-A shown in FIGS. 4 and 5, which highlight the constructive details of the label.

Figure 4:
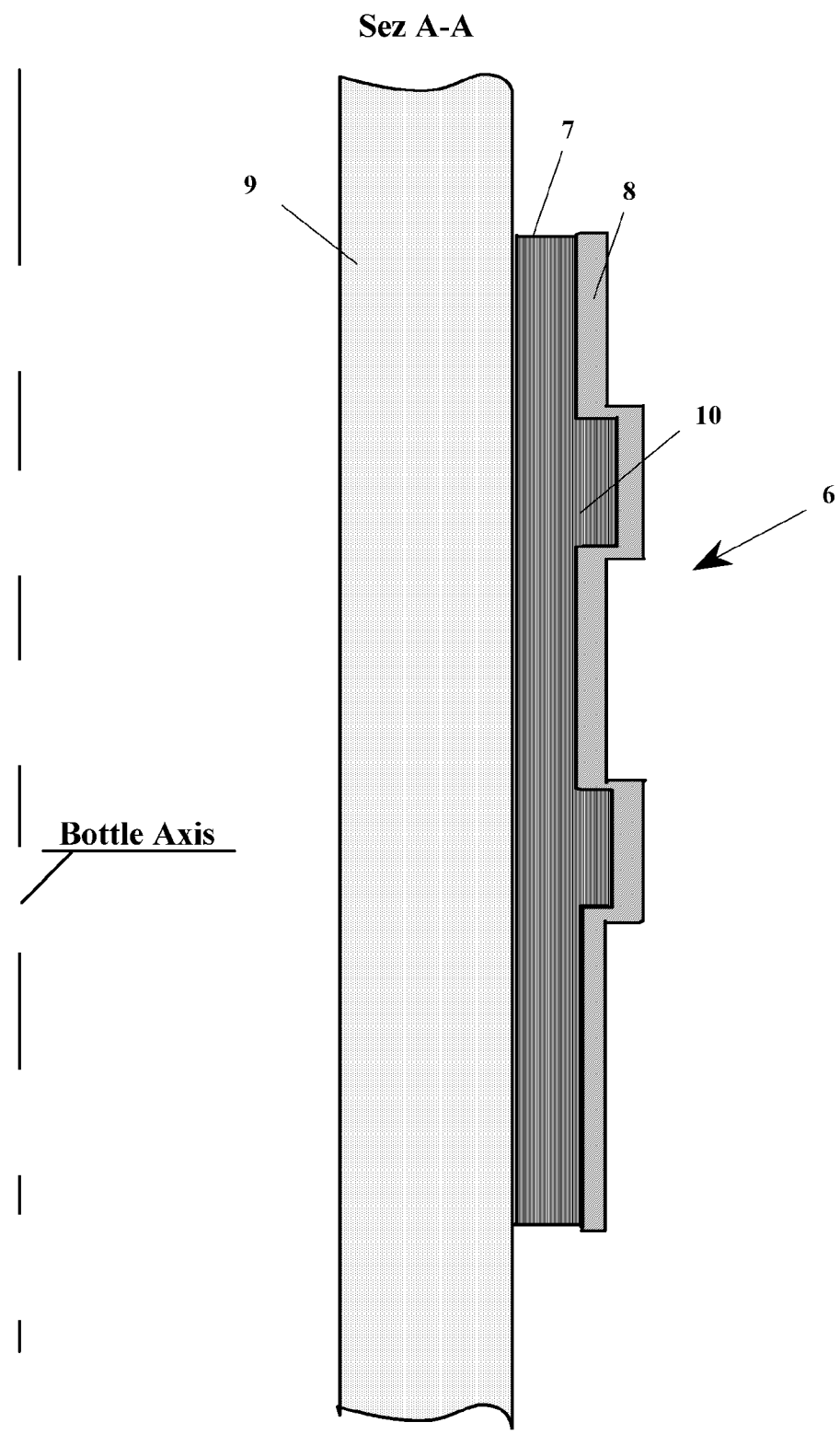
FIGS. 4 and 5 represent respectively a section relative to a label according to the invention applied to the bottle in two configurations, that is to say, that reproducing writings in high relief and that reproducing writings in low relief.

As shown in the cross-section A-A of FIG. 4, the label is thereafter applied to the surface of the bottle 9 having a predetermined longitudinal axis as known in the art. However, the structure of the label is entirely innovative. The first layer of a ceramic material 7, generally terracotta, carries the high relief of writing 10. A second layer 8, generally of an enamelled material such as mortar in general, covers the first layer 7 in a substantially uniform and homogeneous manner, at least just the part reproducing the characters of the layer underneath 7. Thus, the operation of covering will give a protective and particularly luminous effect, by which the writing in high relief 6 obtained in this way will be particularly bright and conspicuous.

Figure 5:
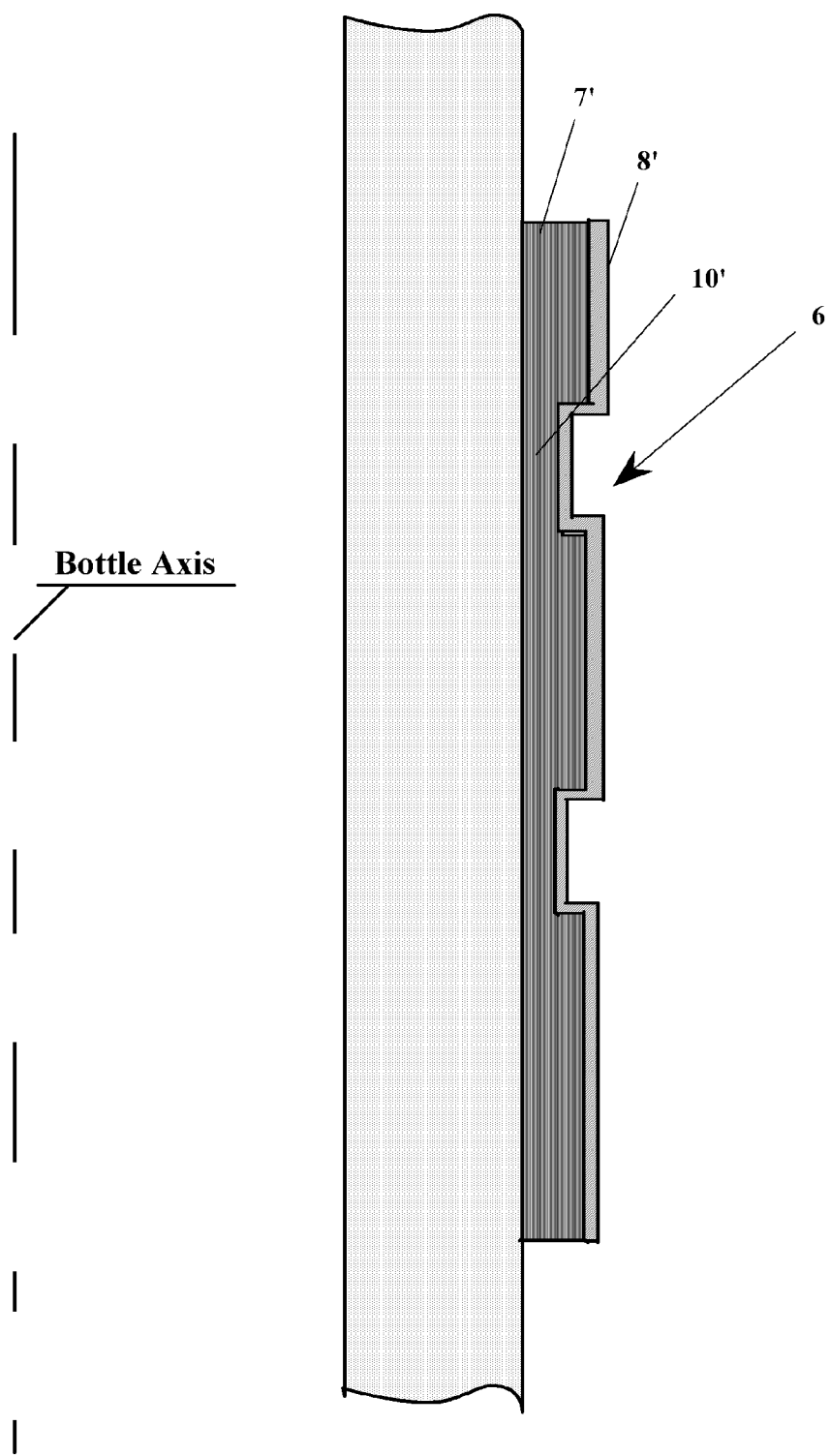

FIG. 5 illustrates an alternative solution, in which the writing in high relief has been simply substituted by a writing in low relief 10'. Combinations of high and low relief of writing can certainly be obtained without for this reason moving apart from the present inventive concept.

Figure 6:
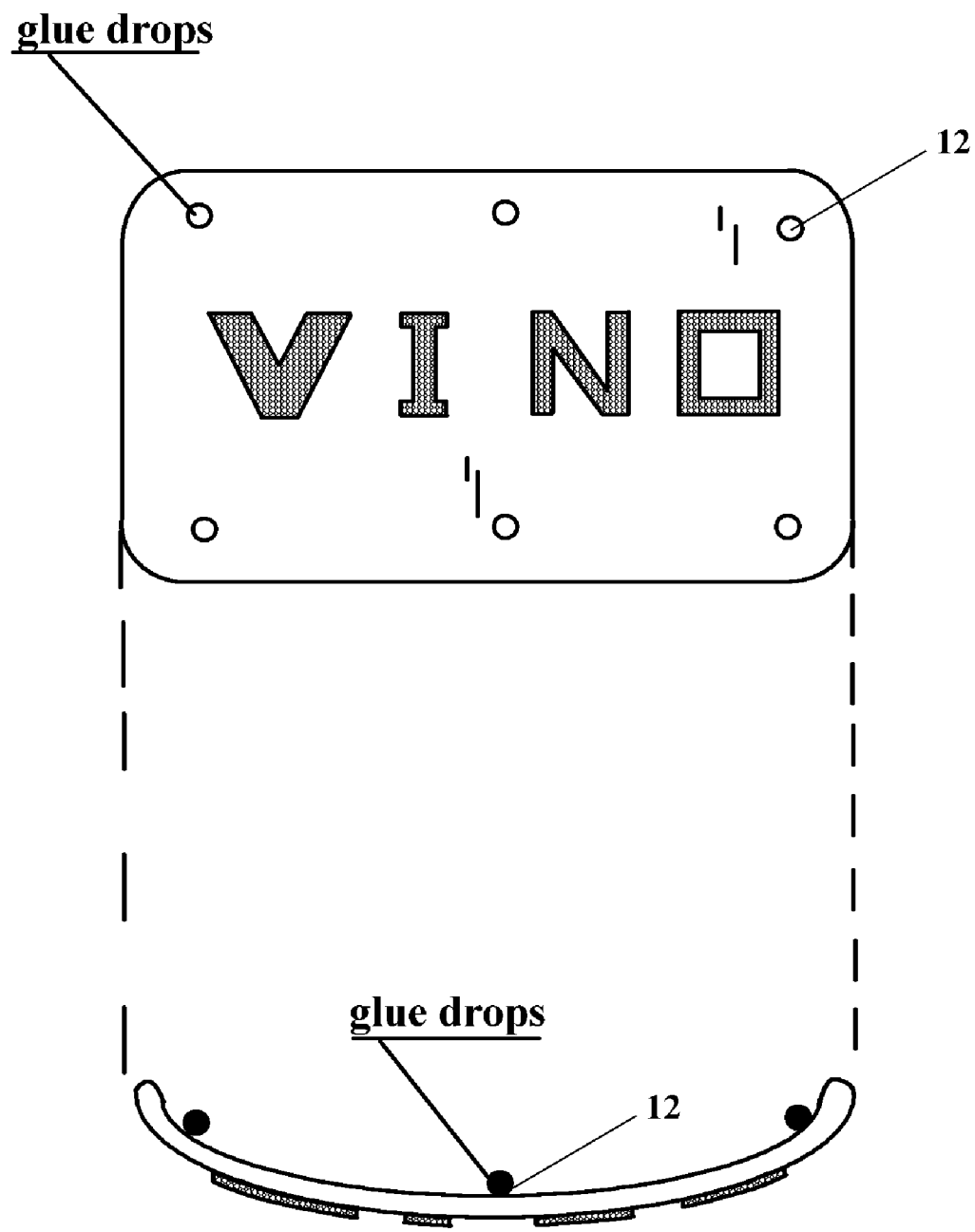
FIGS. 6 and 7 represent details of the gluing of the label to the bottle.

In order to be able to attach the label to the bottle firmly, different solutions can be used. For that purpose, as highlighted in FIG. 6, simple glue drops 12 can be prearranged in generic spots of the label and are indicated for illustration purposes only in the present figure.

Figure 7:
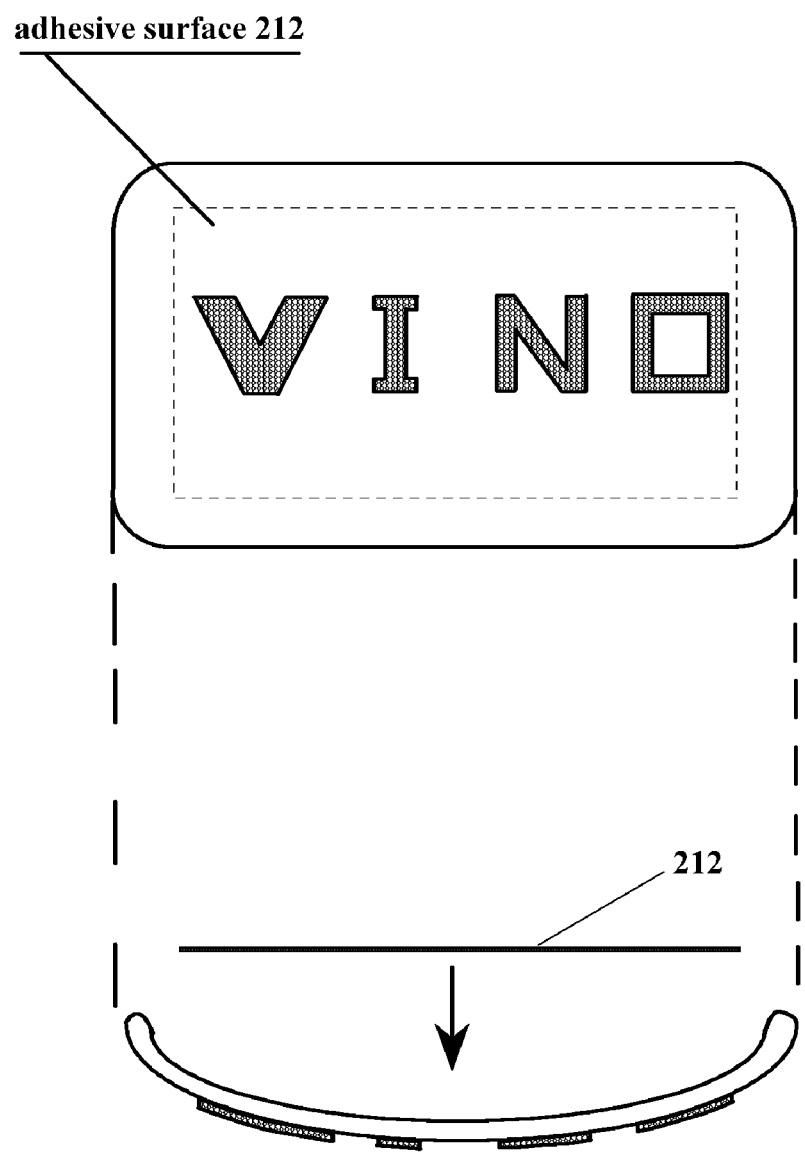

A second preferred solution of the invention (see FIG. 7), involves the application of a surface of a bi-component adhesive material 212. The surface 212 will be attached in correspondence of one of its faces to the internal face 4 of the label, while the opposed face will be attached to the bottle.

We will now describe very briefly the technological process of realization of the label according to the invention.

The ceramic material is suitable for production in appropriate molds of plaster or the like, which are not expensive and are easily reproducible. A mold enables an essentially unlimited opportunity to manufacture different thicknesses and geometries practically unlimitedly. Moreover, the technique of manufacturing in a mold allows producing writings in high or low relief on the labels.

Figure 8:
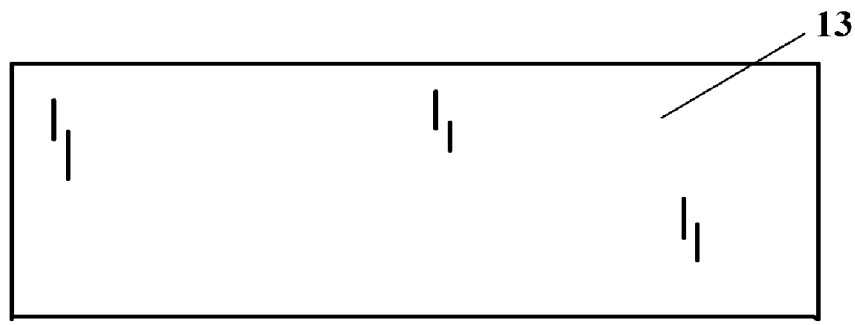
FIG. 8 schematically represents a lateral and top view of the mold for producing the label with a method according to the invention.
Figure 8:
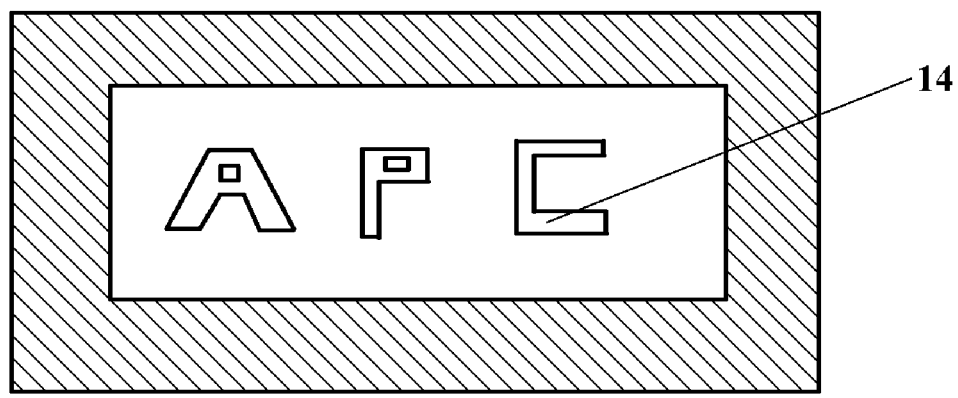

In a first manufacturing step (see FIG. 8), a predetermined quantity of clay is cast inside an appropriate mold 13 that reproduces inside incisions of writing in high and/or low relief 14. The mold is made of plaster derived from a rubber matrix, thus allowing producing easily and cheaply an infinite variety of molds that reproduce logos, even very complex ones. The writings in the mold provide a negative matrix of the final label to be manufactured. FIG. 8, schematically illustrates a mold with a simple rectangular geometry, like that of a box. Any other geometry can certainly be obtained without for this reason moving away from the present inventive concept. Still according to this first preparation step, once cast, the clay has to dry partially so that it gets a certain consistency. Thus, the clay can be extracted and applied to appropriate curved molds such to give it the desired curved shape necessary for the successive application on the bottle. The curved molds are therefore provided with appropriate cavities to allow the application of the label of clay, said curved molds being perforated to enable the passage of air for drying. Once drying is completed, the clay is placed again in the kiln at a temperature of about 980° C. for about 12 hours, thus obtaining the first layer of solid material 7 or 7' of terracotta of FIG. 4 or 5. Such a technique allows therefore the production of various thin measures of thickness, curved shapes and characters not obtainable otherwise with the conventional techniques of lathe milling of ceramic materials.

Successively, a second layer of covering material is applied, which re-covers uniformly at least the characters in high and/or low relief present on the layer of terracotta underneath, and therefore all or part of the external face 5, or even the entire label. A successive firing at about 980° C. will compact the enamel on the first layer of terracotta, thus obtaining a finished ceramic product with writings in high and/or low relief uniformly covered with enamel.

It is now clear how all the aims of the present invention have been reached. In particular, it is clear how it is possible to obtain a label of non-absorbent material, which is practically indestructible by humidity. It is also evident how a label realized according to the present invention overcomes all the inconveniences related to a writing in simple ink, which can be easily affected by humidity. In particular, it is evident how, unlike all ordinary and generally used labels, a label according to the invention allows reproducing three-dimensional writings, which have a greater visual impact on the final consumer of the bottled product. Lastly, it is evident how, unlike U.S. Pat. No. 6,582,805, for example, complex logos can be obtained with such a technique, in which the characters in high and low relief on the layer of terracotta underneath are covered with enamel uniformly, thus obtaining gradual and delicate lines without any effect of color contrast due to incisions.

What is claimed is:

1. A label for bottles comprising:
    a rigid body of a ceramic material reproducing characters in one or more of high or low relief, said rigid body comprising having a partially cylindrical shape and consisting of,
        a first layer of terracotta having the characters configured thereon, said first layer having a thickness of less than four millimeters excluding the characters, and
        a second layer made from enamel and overlapped over said first layer such to cover said characters uniformly.

2. The label according to claim 1, wherein said rigid body is configured according to a predetermined radius of curvature such to trace, at least approximately, a curved shape of a bottle.

3. The label according to claim 1, wherein said label comprises an internal face for placing in adherence to a bottle, said internal face comprising glueing means.

4. The label according to claim 3, wherein said glueing means comprise glue drops placed in predetermined spots on said internal face.

5. The label according to claim 3, wherein said glueing means comprise a layer of an adhesive material.

6. A method of producing a label for bottles comprising the steps of:
    disposing clay in an appropriate mold reproducing characters in one or more of high or low relief, such to produce a first layer having a thickness no higher that four millimeters excluding said characters, such layer being impressed with said characters;
    partially naturally drying said first layer of clay;
    disposing said first layer of clay on a suitably curved tool to acquire a partially cylindrical shape and dry the first layer;
    firing the first layer in a kiln at a temperature of about 980° C., so as to obtain terracotta;
    covering said terracotta with a layer of enamel of high fusibility; and
    firing the terracotta in the kiln at a temperature of about 980° C. so as to coat said characters uniformly.

7. The method according to claim 6, wherein said suitably shaped tool is configured to allow passage of air for the drying step.

8. The method according to claim 6, wherein said firing of the terracotta takes place for about 12 hours.

* * * * *